Patented Sept. 12, 1933

1,926,314

UNITED STATES PATENT OFFICE 1,926,314

PROCESS OF MAKING STYROLS

Omar H. Smith, West Englewood, N. J., assignor to The Naugatuck Chemical Company, Naugatuck, Conn., a corporation of Connecticut No Drawing. Application January 3, 1930
Serial No. 418,435

4 Claims. (Cl. 260—168)

This invention relates to a process of making styrols, more particularly to a process for making them from halogen alkyl benzols, and is a continuation in part of my application Serial No. 361,262, filed May 7, 1929.

It is known that halogen alkyl benzols can be produced from the alkyl benzols by treatment with halogens such as chlorine under varying conditions, and it is also known that styrol can be produced from halogen ethyl benzol by removing the corresponding halogen acid. I have discovered that by making the halogen alkyl benzol under certain definite conditions, styrol can be produced from it by a simpler and more direct method, without isolating intermediate products and in a form directly suitable for polymerizing. By polymerizing styrol under varying conditions, both brittle and tough polymers can be produced which have commercial value, particularly the tough polymer.

An object of my invention is to provide a simple and direct method of making styrols. Another object is to provide a method for making styrols without isolating intermediate products and in which the styrol can be directly obtained in a concentrated form and suitable for polymerizing. Another object is to provide a method of making styrols from halogen alkyl benzols prepared under definite conditions, such that a maximum production of styrol may be had from the halogen alkyl benzol. Other objects will appear from the detailed description and claims.

The invention broadly consists in refluxing a halogen alkyl benzol with an organic base capable of withdrawing the elements of a hydrohalide from the former, at not substantially over atmospheric pressure, and recovering a styrol.

In carrying out the invention, for instance, in the preparation of ordinary styrol from chlor ethyl benzol, 100 parts of ethyl benzol are heated to 90-100° C. and a current of chlorine is passed into the mixture at this temperature until 8-25 parts of chlorine have been absorbed, and a mixture of alpha and beta chlor ethyl benzol is formed, with the alpha predominating. While it is not desired to limit the proportion of chlorine to the exact figures above specified, it is important from a practical point of view, to carefully regulate the amount of chlorine. Too little chlorine gives undesirably low productivity, while too much chlorine gives highly chlorinated products which cannot be used to advantage. Temperature control is also important, and while the above temperature of 90-100° C. is the preferred one, good results have been obtained by the use of temperatures varying between 70 and 120° C. It has been found that when the ethyl benzol is chlorinated under the preferred conditions, the best results are obtained, both with regard to rapidity of chlorine absorption and with regard to the amount of styrol produced per unit of chlorine. The reaction may be carried out in the dark, but best results are obtained when the reaction takes place in light. Diffused daylight has been found satisfactory and also artificial light. Moderate stirring is also desirable. The invention is not limited in its broader aspects, however, to the use of a halogen alkyl benzol prepared as above described.

After chlorination, the above mixture may be fractionated, using a column, and the fraction coming over below 155° C. is considered unchanged ethyl benzol and is returned to the process. This fractionating step is important because the styrol formed subsequently from the residue can be concentrated without difficulty. If this fraction is not removed, the styrol obtained is diluted to such an extent that a satisfactory polymer cannot be obtained from it without further treatment. If the chlorination process is carried further, so as to avoid unchanged ethyl benzol, there results an excessive formation of highly chlorinated products which do not produce styrol when treated according to the invention, thus reducing the efficiency of the process.

After the fraction boiling below 155° C. is removed, the residue is heated under a reflux condenser for several hours with an excess of pyridine at a temperature preferably at or above the boiling point of the mixture and below 220° C. Three hours is a suitable time for the heating, but this time can be varied to some extent with variations in the temperature used without seriously affecting the efficiency of the process. Pyridine hydrochloride and styrol are formed by this treatment, the hydrochloride settling to the bottom of the container in the form of a dark, heavy liquid which becomes solid when cooled. In practical operation, the bulk of the pyridine hydrochloride can be drawn off at the bottom of the kettle while in a liquid state and the pyridine recovered by any usual procedure. To complete the reaction in the shortest practical time, it is preferred to use a temperature above 180° C.

If preferred, the pyridine hydrochloride can be made solid by cooling and the residual liquid drawn off in any convenient manner. The residual liquid which contains styrol and excess pyridine, is carefully acidified with hydrochloric acid until it gives an acid reaction, and it is then steam distilled. The hydrochloride formed from the excess pyridine remains in the steam still, and can be recovered from this by the usual treatment with a cheap base. The steam distillate containing the styrol is dried and fractionated. By this process styrol is isolated in the fraction boiling below 160° C. with a concentration varying from 45–70% depending upon the degree of chlorination. Some hydrocarbon boiling above 160° C. is obtained. This may be accumulated and subjected to a second treatment with pyridine.

As an alternate method for separating styrol and the by-products after the refluxing, the entire mixture obtained may be acidified with hydrochloric acid and then subjected to a steam distillation. In this case, all of the pyridine remains in the steam still as pyridine hydrochloride. This method has the advantage of recovering readily a small amount of styrol which is occluded in the pyridine hydrochloride. Subsequent to the steam distilling, the styrol is isolated as above described. Other organic bases, such as dibenzylamine, quinoline or dimethyl aniline, may be substituted for pyridine, but the latter is the preferred material.

The following examples are given as illustrations of the process:

*Example 1.*—100 parts of ethyl benzol were chlorinated in diffused daylight at 90–100° C. until 20 parts of chlorine had been added. The chlorinated mixture was distilled with a column and 34.8 parts boiling below 155° C. were obtained. The residue was refluxed with 54 parts pyridine for three hours, after which the mixture was acidified and steam distilled. The steam distillate was dried and fractionated. 47.5 parts of colorless distillate having a styrol concentration of 46.8% were obtained.

*Example 2.*—100 parts of ethyl benzol were chlorinated in diffused daylight at 90–100° C. until 22 parts of chlorine were absorbed. The chlorinated mixture was distilled with a column and 43 parts boiling below 155° C. were removed. The residue was refluxed for three hours with 53 parts pyridine. 44 parts steam distillate were obtained, which distillate was fractioned with a column and produced 32.6 parts of a colorless distillate boiling below 160° C. and having a styrol concentration of 70.4%. A convenient way of determining the styrol concentration is by heating a portion of the fraction in a sealed tube over night and determining the amount of meta styrol formed.

*Example 3.*—100 parts of ethyl benzol were chlorinated in diffused daylight at 90–100° C. until 8 parts of chlorine were absorbed. The chlorinated mixture was distilled with a column and 69.3 parts boiling below 155° C. were removed. The residue was refluxed for three hours with 23 parts pyridine and then acidified and steam distilled. 27.3 parts of steam distillate were obtained. The steam distillate was fractionated with a column and 18 parts boiling below 160° C. were obtained. By heating the last named material under a reflux condenser for 119 hours at 115° C., there were obtained 10.7 parts of meta styrol.

*Example 4.*—100 parts of ethyl benzol were chlorinated in the dark at 90–120° C. until 12.2 parts of chlorine had been absorbed. The chlorinated mixture was distilled with a column and 47.4 parts boiling below 155° C. were removed. The residue was refluxed with 30 parts pyridine for 2½ hours at 160–175° C., after which the mixture was acidified and steam distilled. 49.7 parts of colorless steam distillate having a styrol content of 40.7% were obtained.

*Example 5.*—100 parts of ethyl benzol were chlorinated in the dark at 110–120° C. until 11.2 parts of chlorine had been absorbed. The chlorinated mixture was distilled with a column and 55.6 parts boiling below 155° C. were removed. The residue was refluxed with 26.5 parts pyridine for 1½ hours at 200–230° C., after which the mixture was acidified and steam distilled. 36.8 parts of colorless steam distillate having a styrol content of 53% were obtained.

By the use of my process, styrol can be obtained in a concentration suitable for direct polymerization, and by the carefully regulated process of halogenating the alkyl benzol, a halogenated alkyl benzol is obtained which gives maximum production of the styrol by a simple and direct treatment, and the low boiling portion obtained from the product of heating the halogenated alkyl benzol and organic base can be directly returned to the process.

While specific illustrations of the process have been given in detail, it is obvious that modifications may be made in the process without departing from the scope of the appended claims.

Having thus described my invention, what I claim and desire to protect by Letters Patent is:

1. A process for making styrols which comprises bringing together chlor ethyl benzol and an organic base heating under a reflux condenser to at least the boiling point of the mixture and recovering a styrol from the reaction products.

2. A process for making styrols which comprises bringing together chlor ethyl benzol and a base including a cyclic group, forming a styrol and a hydrochloride of the base by heating to boiling at not over atmospheric pressure and under a reflux condenser, and recovering a styrol.

3. A process for making styrols which comprises bringing together chlor ethyl benzol and pyridine, forming styrol and pyridine hydrochloride by heating at not over atmospheric pressure under a reflux condenser below approximately 220° C., and recovering the styrol.

4. A process for making styrols which comprises bringing together chlor ethyl benzol and a base including a cyclic group, forming a styrol and a chloride of the base by heating at not over atmospheric pressure and at above 180° C. under a reflux condenser for less than three hours, and recovering a styrol.

OMAR H. SMITH.